(12) United States Patent
Pahkala et al.

(10) Patent No.: US 12,334,826 B2
(45) Date of Patent: *Jun. 17, 2025

(54) PEAK CURRENT LIMIT MANAGEMENT FOR HIGH FREQUENCY BUCK CONVERTER

(71) Applicant: TEXAS INSTRUMENTS INCORPORATED, Dallas, TX (US)

(72) Inventors: Janne Matias Pahkala, Oulu (FI); Jussi Matti Aleksi Särkkä, Oulunsalo (FI); Juha Olavi Hauru, Oulu (FI)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,596

(22) Filed: Feb. 15, 2024

(65) Prior Publication Data

US 2024/0195300 A1 Jun. 13, 2024

Related U.S. Application Data

(63) Continuation of application No. 17/564,334, filed on Dec. 29, 2021, now Pat. No. 11,949,333.

(51) Int. Cl.
*H02M 3/158* (2006.01)
*H02M 1/00* (2006.01)
*H02M 1/32* (2007.01)

(52) U.S. Cl.
CPC ......... *H02M 3/158* (2013.01); *H02M 1/0054* (2021.05); *H02M 1/32* (2013.01)

(58) Field of Classification Search
CPC .... H02M 3/158; H02M 3/1588; H02M 3/156; H02M 1/32; H02M 1/0025; H02M 1/0003; H02M 3/157
See application file for complete search history.

(56) References Cited

U.S. PATENT DOCUMENTS

| | | | |
|---|---|---|---|
| 7,498,690 B2* | 3/2009 | Sharma | H02M 3/158 307/38 |
| 8,513,920 B2 | 8/2013 | Scaldaferri | |
| 10,948,934 B1* | 3/2021 | Young | H02M 3/156 |
| 2015/0188408 A1 | 7/2015 | Huang | |
| 2016/0329815 A1 | 11/2016 | Massolini et al. | |
| 2017/0331363 A1* | 11/2017 | Travaglini | H02M 3/158 |
| 2019/0058398 A1 | 2/2019 | Sharifi et al. | |
| 2020/0382001 A1 | 12/2020 | Pahkala | |

* cited by examiner

*Primary Examiner* — Alex Torres-Rivera
(74) *Attorney, Agent, or Firm* — Valerie M. Davis; Frank D. Cimino

(57) ABSTRACT

A controller for a voltage converter, such as a buck converter, includes: a switching regulator circuit having high side and low side switches; comparators configured to compare a voltage of an output circuit to reference voltages; and a control circuit coupled to the current comparators, configured to receive outputs from the comparators, and configured to generate a control signal for alternatingly switching the high side and low side switches off and on, such that the low side switch is off when the high side switch is on, and the high side switch is off when the low side switch is on, and wherein the control circuit includes a latching circuit configured to latch a signal corresponding to at least one of the outputs from the comparators. A method of operating a buck converter in connection with a fixed high-frequency automotive radar system, with reliable overcurrent detection, is also disclosed.

10 Claims, 6 Drawing Sheets

PEAK CURRENT LIMIT MANAGEMENT FOR HIGH FREQUENCY BUCK CONVERTER

CROSS-REFERENCE TO RELATED APPLICATION

This application is a continuation of U.S. patent application Ser. No. 17/564,334, filed Dec. 29, 2021, which is incorporated herein by reference in its entirety.

BACKGROUND

A voltage converter steps an input voltage up or down to produce an output voltage that is suited for an electronic device. One class of voltage converters is switching converters in which one or more transistors are turned on and off in accordance with a target duty cycle to produce the output voltage. A buck converter is an example of a switching voltage converter. The output voltage of a buck converter is typically a lower voltage than the input voltage. An example of a buck converter is disclosed in U.S. patent application Ser. No. 16/945,666, filed Jul. 31, 2020 (Current Limiting Technique for Buck Converters). The entire disclosure of U.S. patent application Ser. No. 16/945,666 is incorporated herein by reference.

SUMMARY

According to one aspect of the present description, a controller for a voltage converter includes: a switching regulator circuit having high side and low side switches coupled between an input and an output; a current comparison circuit having comparators configured to compare a voltage of an output circuit to reference voltages; and a switching regulator control circuit coupled to the current comparison circuit, configured to receive outputs from the comparators, and configured to generate a control signal for alternatingly switching the high side and low side switches off and on, such that the low side switch is off when the high side switch is on, and the high side switch is off when the low side switch is on, and wherein the switching regulator control circuit includes a latching circuit configured to latch a signal corresponding to at least one of the outputs from the comparators.

According to another aspect of the present description, a controller for a buck converter is configured to convert an input voltage to an output voltage, the output voltage being less than the input voltage, and the controller includes: a switching regulator circuit having an input, an output, and high side and low side switches coupled to each other in series between the input and output; a current comparison circuit having inputs, coupled to the output of the switching regulator circuit, and adapted to be coupled to an input of an output circuit, and comparators configured to compare a voltage of the output circuit to reference voltages; and a switching regulator control circuit coupled to the current comparison circuit, configured to receive outputs from the comparators, and configured to generate a control signal for alternatingly switching the high side and low side switches off and on, such that the low side switch is off when the high side switch is on, and the high side switch is off when the low side switch is on, and wherein the switching regulator control circuit includes a latching circuit configured to latch a signal corresponding to at least one of the outputs from the comparators, such that current in the output circuit is reliably detected.

According to another aspect of the present description, an input voltage is converted to an output voltage, the output voltage is less than the input voltage, and the conversion method includes: providing high side and low side switches, coupling the input voltage to the high side switch, and coupling the low side switch to ground, and alternatingly coupling the high side and low side switches to an inductor; comparing a voltage representative of a current in the inductor to reference voltages; and applying outputs from the comparators to a switching regulator control circuit, using the switching regulator control circuit to generate a control signal for alternatingly switching the high side and low side switches off and on, such that the low side switch is off when the high side switch is on, and the high side switch is off when the low side switch is on, and using a latching circuit to latch a signal corresponding to at least one of the outputs from the comparators, such that an overcurrent condition in the inductor is reliably detected, even when the switching is performed at high frequency.

DETAILED DESCRIPTION

Figure 1:
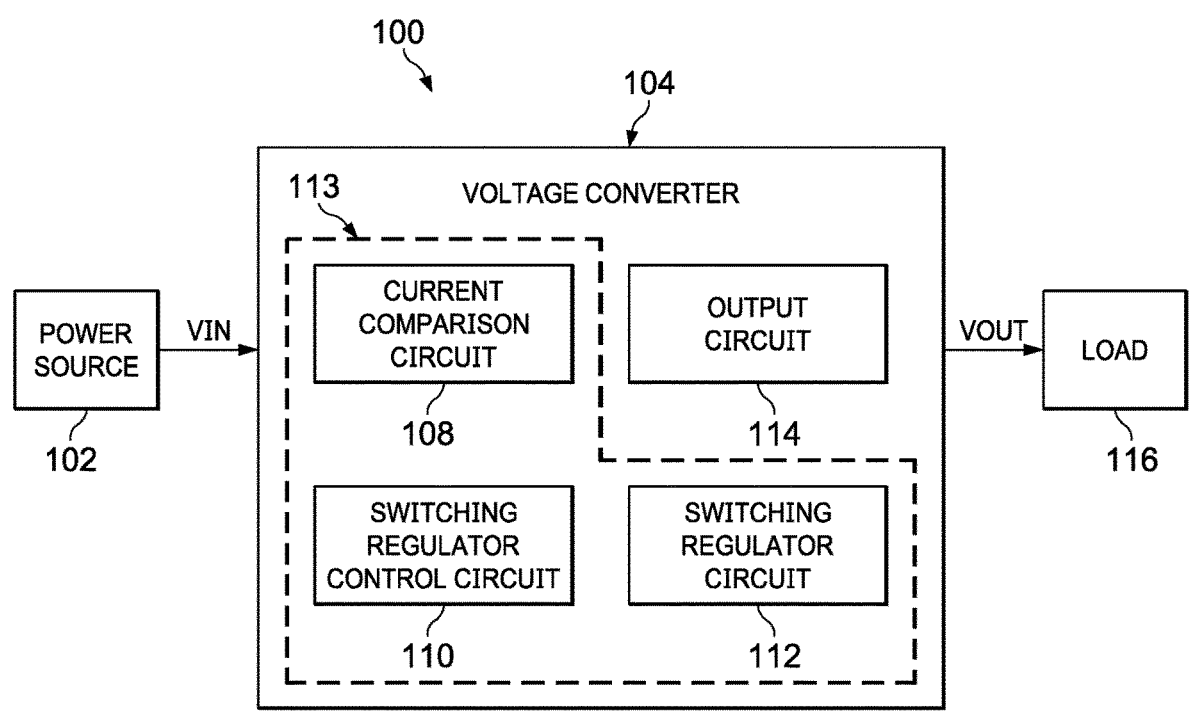
FIG. 1 is a block diagram of an example of a system which includes a power source, a voltage converter, and a load.

As noted above, switching voltage converters include one or more transistors that are operated as switches to regulate the output voltage of the converter. A buck converter, for example, includes two switching transistors—a high-side transistor coupled to a low-side transistor at a switching node. A transistor consumes very little power when fully on or fully off. However, while being turned on or off, a transistor consumes power referred to as "switching losses." Further, a transistor may be susceptible to high ringing voltages, or voltage spikes, because of an output circuit coupled between the transistor and a load. The output circuit may include, for example, an inductor that begins to store energy responsive to a first transistor (e.g., the high-side transistor) having an on state and a second transistor (e.g., the low-side transistor) having an off state. Responsive to the transistors switching states, energy stored in the inductor may begin to dissipate to maintain a current to the load, and thus voltage spikes may occur at the switching node where the transistors and the output circuit are coupled. The voltage spikes may result in failure of the transistors or other components, or may cause corresponding spikes in the current to the load, and may damage or interfere with operations of the load.

In accordance with an example embodiment, a voltage converter includes a current comparison circuit to help manage voltage spikes by, among other things, responding to measurements only when the measurement information is likely to be reliable, such as when spiky noise is not occurring. The current comparison circuit may include a comparator to compare a voltage associated with a current of an output circuit to a reference voltage associated with a current limit level. A voltage associated with the current of the output circuit may be measured at the switching node and may be referred to as a sensed voltage. As the current of the output circuit increases, the sensed voltage decreases. To determine whether the current of the output circuit is above the current limit level, the current comparison circuit may determine whether the sensed voltage is less than the reference voltage. The current limit level may be set to a value that is slightly higher than a current needed to supply a load adapted to be coupled to the voltage converter.

The current comparison circuit may also include a second comparator to compare the sensed voltage to a second reference voltage associated with a second current limit level. As the current of the output circuit decreases, the sensed voltage increases. To determine whether the current of the output circuit is below the second current limit level, the current comparison circuit may determine whether the sensed voltage is greater than the second reference voltage. The second current limit level may be set to a value slightly less than a current that is chosen according to any suitable criteria for a particular system or device.

The voltage converter described by way of example herein limits a current of the output circuit such that the current of the output circuit remains between upper and lower current limit levels. The current limit levels may include, for example, a first set of current limit levels and a second set of current limit levels. The first set of current limit levels may define an upper current limit range within which the current of the output circuit is to operate, and the second set of current limit levels may define a lower current limit range within which the current of the output circuit is to operate. Each current limit range includes an upper current limit level and a lower current limit level. For example, the upper current limit range may have an upper current limit level of 5 amperes (A) and a lower current limit level of 4 A, and the lower current limit range may have a lower current limit level of −2 A and an upper current limit level of −1 A. But these are examples. This description should not be limited by numerical values mentioned for purpose of example.

FIG. 1 is a block diagram of an example of a system 100 which has a voltage converter 104. The voltage converter 104 may be, for example, a fixed high-frequency buck converter for supplying power to an automotive radar apparatus. In one example, the switching frequency of the voltage converter is greater than 15 MHZ, or greater than 20 MHz. In a specific example, the switching frequency is 21.12 MHz. Again, however, this description should not be limited by numerical values mentioned herein. The scope of the claimed subject matter should be defined according to the appended claims. The system 100 may be representative of any system or device including a voltage converter, and particularly any system or device including a high-frequency step-down converter (e.g., a buck converter). Accordingly, the system 100 may benefit from limiting an output current such that the current is within tolerances to maintain compliance with applicable safety and other standards.

The system 100 illustrated in FIG. 1 includes a power source 102, the voltage converter 104, and a load 116. In the illustrated configuration, the power source 102 is coupled to the voltage converter 104. The power source 102 may be any device capable of supplying a DC voltage to the voltage converter 104. For example, the power source 102 may be a power storage component (e.g., a battery), or an AC-to-DC converter. As an AC-to-DC converter, the power source may include a rectifier circuit configured to convert an AC voltage to a DC voltage (e.g., an alternator). The voltage converter 104 receives an input voltage VIN from the power source 102 and supplies a regulated output voltage VOUT to the load 116. In the example of FIG. 1, the voltage converter 104 includes a current comparison circuit 108, a switching regulator control circuit 110, a switching regulator circuit 112, and an output circuit 114. The current comparison circuit 108, the switching regulator control circuit 110, and the switching regulator circuit 112 are elements of a controller for the voltage converter 104. The load 116 may be any suitable component, circuit, or device adapted to receive and be powered by the output voltage VOUT from the voltage converter 104. For example, the load 116 may be, or may be a component of, an automotive radar apparatus.

In operation, the power source 102 outputs the input voltage VIN to the voltage converter 104 for processing by the voltage converter 104. The voltage converter 104 processes the input voltage VIN and outputs the output voltage VOUT to power the load 116. The current comparison circuit 108 enables the voltage converter 104 to cause a transistor to switch on responsive to an indication that a current of the output circuit 114 has crossed a current limit level. The switching regulator control circuit 110 drives the switching regulator circuit 112 responsive to one or more signals from the current comparison circuit 108. Responsive to an output signal of the switching regulator control circuit 110, the switching regulator circuit 112 switches states of transistors in an alternating manner. The output circuit 114 regulates and filters the voltage of the switching regulator circuit 112 to generate the output voltage VOUT having a current that is within the current limit levels. The load 116 operates, at least partially, according to the output voltage VOUT. In examples where the voltage converter 104 is a step-down converter, such as a buck converter, the output voltage VOUT is less than the input voltage VIN.

Figure 2:
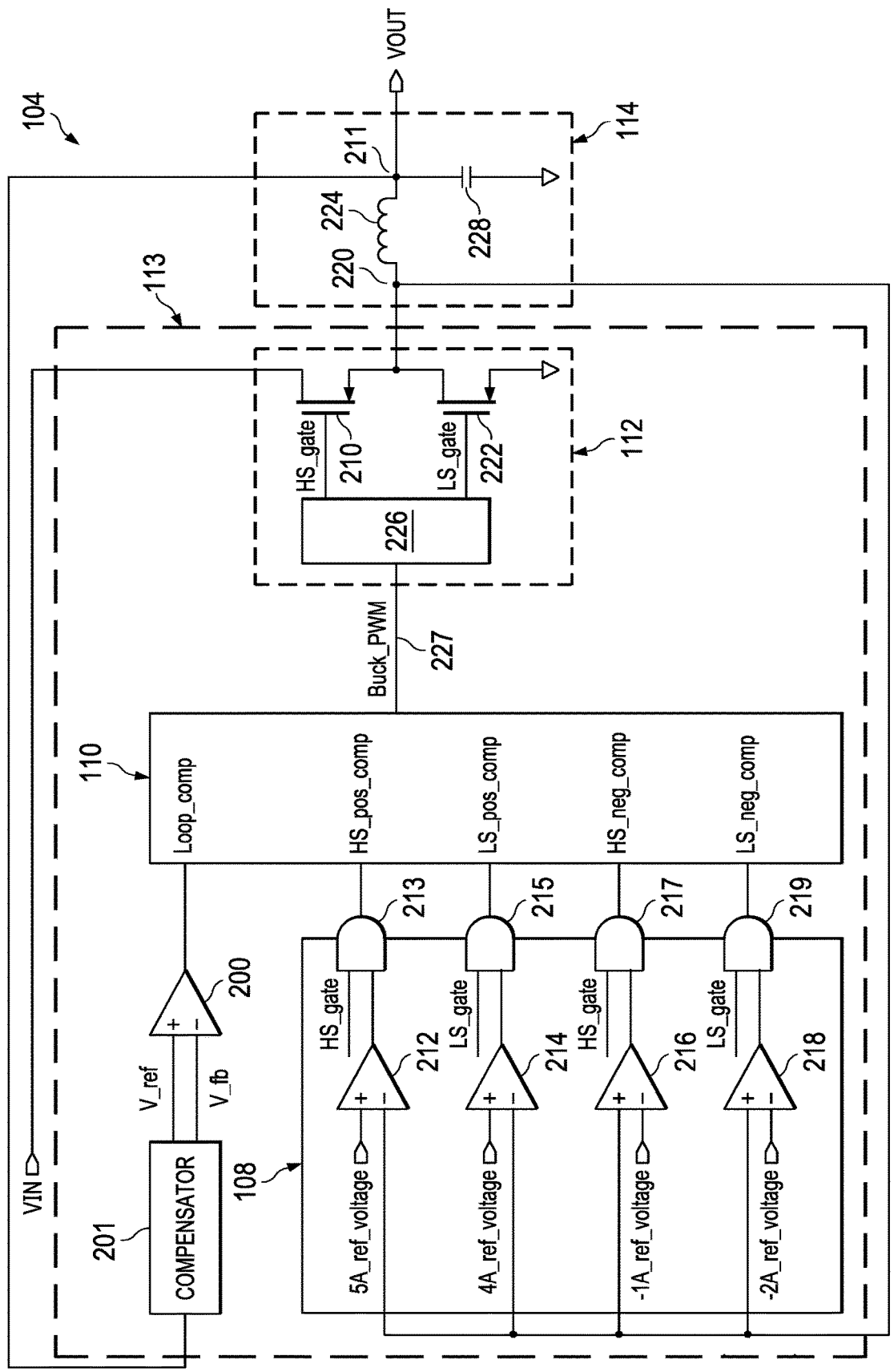
FIG. 2 is a circuit diagram of the voltage converter of FIG. 1.

FIG. 2 is an example circuit diagram of the voltage converter 104. As described above with respect to FIG. 1, the voltage converter 104 includes the current comparison circuit 108, the switching regulator control circuit 110, the switching regulator circuit 112, and the output circuit 114. The voltage converter 104 may also include a loop comparator 200.

In operation, the current comparison circuit 108 receives multiple reference voltages and is coupled to the switching regulator control circuit 110, to the switching regulator circuit 112, and to the output circuit 114. Each reference voltage is associated with a respective current limit level. The different current limit levels are application-specific and may be determined using any suitable criteria. For example, first and second current limit levels may determine an upper current limit range for the output current of the voltage converter 104 while third and fourth current limit levels may determine a lower current limit range for the output current of the voltage converter 104. The reference voltages may be supplied by any suitable component, circuit, or device configured to supply such voltages.

The illustrated current comparison circuit 108 includes first, second, third, and fourth comparators 212, 214, 216, 218. A non-inverting terminal of the first comparator 212 receives a reference voltage 5A_ref_voltage. The reference voltage 5A_ref_voltage may be associated with a current limit level of 5 A, for example. An inverting terminal of the first comparator 212 is coupled to a switching node 220, a source of a high side (HS) transistor (an example of a HS switch) 210, a drain of a low side (LS) transistor (an example of a LS switch) 222, and a first end of an inductor 224. An output terminal of the first comparator 212 is applied to an input of a first AND gate 213. A high-side gate signal HS_gate is applied to another terminal of the first AND gate 213. An output terminal of the first AND gate 213 is coupled to an input HS_pos_comp of the switching regulator control circuit 110. In the illustrated example, when the current sensed at the switching node 220 is greater than 5 A, and the high-side gate signal HS_gate is high, the input HS_pos_comp of the switching regulator control circuit 110 is high. Otherwise, the input HS_pos_comp is low.

A non-inverting terminal of the second comparator 214 receives a second reference voltage 4A_ref_voltage. The second reference voltage 4A_ref_voltage may be associated with a current limit level of 4 A, for example. An inverting terminal of the second comparator 214 is coupled to the switching node 220. An output terminal of the second comparator 214 is applied to an input of a second AND gate 215. A low-side gate signal LS_gate is applied to another input terminal of the second AND gate 215. An output terminal of the second AND gate 215 is coupled to a second input LS_pos_comp of the switching regulator control circuit 110. In the illustrated example, when the current sensed at the switching node 220 is greater than 4 A, and the low-side gate signal LS_gate is high, the second input LS_pos_comp of the switching regulator control circuit 110 is high. Otherwise, the second input LS_pos_comp is low.

An inverting terminal of the third comparator 216 receives a third reference voltage −1A_ref_voltage. The third reference voltage −1A_ref_voltage may be associated with a current limit level of −1 A, for example. A non-inverting terminal of the third comparator 216 is coupled to the switching node 220. An output terminal of the third comparator 216 is applied to an input of a third AND gate 217. The high-side gate signal HS_gate is applied to another input terminal of the third AND gate 217. An output terminal of the third AND gate 217 is coupled to a third input HS_neg_comp of the switching regulator control circuit 110. In the illustrated example, when the current sensed at the switching node 220 is less than −1 A, and the high-side gate signal HS_gate is high, the third input HS_neg_comp of the switching regulator control circuit 110 is high. Otherwise, the third input HS_neg_comp is low.

An inverting terminal of the fourth comparator 218 receives a fourth reference voltage −2A_ref_voltage. The fourth reference voltage −2A_ref_voltage may be associated with a current limit level of −2 A, for example. A non-inverting terminal of the fourth comparator 218 is coupled to the switching node 220, and an output terminal of the fourth comparator 218 is applied to an input of a fourth AND gate 219. The low-side gate signal LS_gate is applied to another input terminal of the fourth AND gate 213. An output terminal of the fourth AND gate 213 is coupled to a fourth input LS_neg_comp of the switching regulator control circuit 110. In the illustrated example, when the current sensed at the switching node 220 is less than −2 A, and the low-side gate signal LS_gate is high, the fourth input LS_neg_comp of the switching regulator control circuit 110 is high. Otherwise, the fourth input LS_neg_comp is low.

The switching regulator control circuit 110 is coupled to the current comparison circuit 108, and to the switching regulator circuit 112. The switching regulator control circuit 110 also includes a loop input Loop_comp that is coupled to an output of the loop comparator 200. Thus, the switching regulator control circuit 110 includes multiple inputs and an output 227 coupled to a driver circuit 226 of the switching regulator circuit 112. A PWM signal Buck_PWM is provided at the output 227 of the switching regulator control circuit 110, and is applied to the driver circuit 226.

The switching regulator circuit 112 receives the input voltage VIN and is coupled to the switching regulator control circuit 110, the output circuit 114, and the current comparison circuit 108. In the illustrated configuration, the switching regulator circuit 112 includes the driver circuit 226, the high side (HS) transistor 210, and the low side (LS) transistor 222. In the illustrated example, the transistors 210, 222 are field-effect transistors (FETs), preferably high-voltage n-channel FETs (NFETs). The driver circuit 226 is coupled to the output 227 of the switching regulator control circuit 110, a gate terminal of the HS transistor 210, and a gate terminal of the LS transistor 222. The driver circuit 226 applies the gate signals HS_gate, LS_gate to the gate terminals of the HS and LS transistors 210, 222. The drive circuit 226 may be any suitable circuit configured to switch the transistors 210, 222 in an alternating fashion such that when the HS transistor 210 is on, the LS transistor 222 is off, and such that when the HS transistor 210 is off, the LS transistor 222 is on.

A drain terminal of the HS transistor 210 receives the input voltage VIN. The source terminal of the HS transistor 210 is coupled to the drain terminal of the LS transistor 222, the switching node 220, a first end of the inductor 224, the inverting terminals of the first and second comparators 212, 214, and the non-inverting terminals of the third and fourth comparators 216, 218. A source terminal of the LS transistor 222 is coupled to a ground terminal.

The output circuit 114 is adapted to be coupled to the load 116 (FIG. 1), and is coupled to the current comparison circuit 108 (FIG. 2) and the switching regulator circuit 112. In the illustrated configuration, the output circuit 114 includes the switching node 220, the inductor 224, the output node 211, and a capacitor 228. The first end of the inductor 224 is coupled to the switching node 220, the inverting terminals of the first and second comparators 212, 214, the non-inverting terminals of the third and fourth comparators 216, 218, the source terminal of the HS transistor 210, and the drain terminal of the LS transistor 222. A second end of the inductor 224 is adapted to be coupled to the load 116 (FIG. 1) and is coupled to a first end of the capacitor 228, the output node 211, and a suitable compensator 201. A second end of the capacitor 228 is coupled to the ground terminal. The output voltage VOUT is provided at the output node 211.

The loop comparator 200 is coupled to the switching regulator control circuit 110 and the compensator 201. In operation, a reference voltage V_ref is applied to a non-inverting terminal of the loop comparator 200. The reference voltage V_ref may be supplied by the compensator 201. In the illustrated configuration, the compensator 201 is an element of the controller for the voltage converter 104. The reference voltage V_ref may be referred to as a feedback voltage threshold. In the illustrated configuration, the inverting terminal of the loop comparator 200 is coupled to a feedback voltage V_fb, from the compensator 201. The feedback voltage V_fb corresponds to the voltage at the output node 211, and the output terminal of the comparator 200 is coupled to a corresponding input Loop_comp of the switching regulator control circuit 110. The loop input Loop_comp is high when the feedback voltage V_fb, representative of the output voltage VOUT, is less than the reference voltage V_ref. Otherwise, the loop input Loop_comp is low.

The operation of the current comparison circuit 108 is now described in more detail, in connection with a particular example. The first reference voltage 5A_ref_voltage may be associated with a target inductor current of 5 A, for example. The inductor current is a current of the inductor 224 and may be referred to as the current of the output circuit 114. In the illustrated configuration, the first reference voltage 5A_ref_voltage is associated with a current limit level that corresponds to a current that is slightly greater than a current level needed to operate a system or device. For example, the reference voltage 5A_ref_voltage may be associated with a current limit level that is 0.5 A greater than a current needed to operate a system or device. In the illustrated configuration, the maximum desired inductor current is 4.5 A which is halfway between the two current limit levels (4 A and 5 A) of the upper current limit range. The present description should not be limited, however, to the specific numerical values described herein by way of example. In some examples, the reference voltage 5A_ref_voltage is application-specific and may be chosen according to suitable criteria for a particular system or device.

The first comparator 212 compares the reference voltage 5A_ref_voltage to the sensed voltage provided at the switching node 220. As described above, the sensed voltage is associated with a current of the output circuit 114. Because the current of the output circuit 114 is measured at the switching node 220 (where the transistors 210, 222 are coupled to the output circuit 114), the current of the output circuit 114 may be referred to as an input current of the output circuit 114. Based on the comparison, the first comparator 212 generates an output signal that indicates whether the reference voltage 5A_ref_voltage is greater than or less than the sensed voltage. When the high-side gate signal HS_gate is high, the output signal of the first comparator 212 is provided to the first input HS_pos_comp of the switching regulator control circuit 110.

The second reference voltage 4A_ref_voltage may be associated with a target inductor current of 4 A, in this example. In some examples, the second reference voltage 4A_ref_voltage is associated with a current limit level that is slightly lower than a current needed to ensure that reliable current sensing information is available to prevent the sensed voltage from becoming less than the first reference voltage 5A_ref_voltage responsive to the HS transistor 210 switching on. For example, the second reference voltage 4A_ref_voltage may be associated with a current limit level that is 0.2 A lower than a current needed to ensure that reliable current sensing information is available to prevent the sensed voltage from becoming less than the first reference voltage 5A_ref_voltage responsive to the HS transistor 210 switching on.

In some examples, the second reference voltage 4A_ref_voltage is application-specific and is chosen according to suitable criteria for a particular system or device. In examples, the first and second reference voltages 5A_ref_voltage, 4A_ref_voltage correspond to upper and lower current limit levels, respectively, of an upper current limit range within which the inductor current is to operate. The second comparator 214 compares the second reference voltage 4A_ref_voltage to the sensed voltage. Based on the comparison, the second comparator 214 generates an output signal that indicates whether the second reference voltage 4A_ref_voltage is greater than or less than the sensed voltage. When the low-side gate signal LS_gate is high, the output signal of the second comparator 214 is provided to the second input LS_pos_comp of the switching regulator control circuit 110.

In the illustrated configuration, the third reference voltage −1A_ref_voltage, which is supplied to the inverting terminal of the third comparator 216, is associated with a target inductor current of −1 A, for example. In some examples, the third reference voltage −1A_ref_voltage is associated with a current limit level that is slightly higher than a current needed to ensure that reliable current sensing information is available to prevent the sensed voltage from having a value that is greater than the fourth reference voltage −2A_ref_voltage responsive to the LS transistor 222 switching on. For example, the third reference voltage −1A_ref_voltage may be associated with a current limit level that is 0.2 A higher than a current needed to ensure that reliable current sensing information is available to prevent the sensed voltage from exceeding the fourth reference voltage −2A_ref_voltage responsive to the LS transistor 222 switching on. In some examples, the third reference voltage −1A_ref_voltage is application-specific and is chosen according to suitable criteria for a particular system or device. The third comparator 216 compares the third reference voltage −1A_ref_voltage to the sensed voltage. Based on the comparison, the third comparator 216 generates an output signal that indicates whether the reference voltage −1A_ref_voltage is greater than or less than the sensed voltage. When the high-side gate signal HS_gate is high, the output signal of the third comparator 216 is provided to the third input HS_neg_comp of the switching regulator control circuit 110.

The fourth reference voltage −2A_ref_voltage may be associated with a target inductor current of −2 A, for example. In some examples, the fourth reference voltage −2A_ref_voltage is associated with a current limit level that is slightly lower than a minimum current needed for the system or device to operate. For example, the fourth reference voltage −2A_ref_voltage may be associated with a current limit level that is 0.5 A lower than a minimum current needed for the system or device to operate. The reference voltage −2A_ref_voltage may be chosen according to any suitable criteria for a particular system or device. The third and fourth reference voltages −1A_ref_voltage, −2A_ref_voltage may be, for example, upper and lower current limit levels of a lower current limit range within which the inductor current is to operate. The fourth comparator 218 compares the fourth reference voltage −2A_ref_voltage to the sensed voltage. Based on the comparison, the fourth comparator 218 generates an output signal that indicates whether the fourth reference voltage −2A_ref_voltage is greater or less than the sensed voltage. When the low-side gate signal LS_gate is high, the output signal generated by the fourth comparator 218 is provided to the fourth input LS_neg_comp of the switching regulator control circuit 110.

Certain operations of the switching regulator circuit 112 and the output circuit 114 are now described. The driver circuit 226 receives the PWM signal Buck_PWM from the switching regulator control circuit 110 as an input. Responsive to the PWM signal Buck_PWM indicating the high side (HS) transistor 210 is to be enabled, the driver circuit 226 drives the gate terminal of the HS transistor 210 high and drives the gate terminal of the low side (LS) transistor 222 low. Responsive to the gate terminal of the HS transistor 210 being high, the HS transistor 210 allows current to propagate from the drain terminal of the HS transistor 210 to the source terminal of the HS transistor 210, or negative inductor current is allowed to propagate from the source terminal of the HS transistor 210 to the drain terminal of the HS transistor 210, and the HS transistor 210 is described as on.

Responsive to the gate terminal of the LS transistor 222 being low, the LS transistor 222 prevents current from propagating from the drain terminal of the LS transistor 222 to the source terminal of the LS transistor 222, and the LS transistor 222 is described as off. In operation, responsive to the HS transistor 210 being on and the LS transistor 222 being off, a current propagates through the HS transistor 210 to the switching node 220 and through the inductor 224. As current propagates through the inductor 224 and to the capacitor 228, energy is stored in the inductor 224, the capacitor 228 begins to build a charge, and the output voltage VOUT is provided at the output node 211. The input current of the output circuit 114 is provided at the switching node 220 and a corresponding sensed voltage may be measured at the switching node 220.

Responsive to the PWM signal Buck_PWM indicating the HS transistor 210 is to be disabled, the driver circuit 226 drives the gate terminal of the HS transistor 210 low and drives the gate terminal of the LS transistor 222 high. Responsive to the gate terminal of the HS transistor 210 being low, no current propagates through the HS transistor 210. Responsive to the gate terminal of the LS transistor 222 being high, current is allowed to propagate through the LS transistor 222. Thus, responsive to the LS transistor 222 switching on, the stored energy of the inductor 224 begins to dissipate and the inductor current decreases. The decreasing inductor current is provided at the switching node 220 and a corresponding sensed voltage may be measured at the switching node 220.

The operation of the loop comparator 200 is now described. The loop comparator 200 compares the reference voltage V_ref to the feedback voltage V_fb. (The reference and feedback voltages V_ref, V_fb are generated by the compensator 201.) Based on the comparison, the comparator 200 generates an output signal that indicates whether the feedback voltage V_fb is greater than or less than the reference voltage V_ref. The output signal of the comparator 200 is provided to the corresponding input Loop_comp of the switching regulator control circuit 110. Thus, the loop input Loop_comp triggers when the feedback voltage V_fb falls below the reference voltage V_ref, and defines an inductor current peak value.

Figure 3:
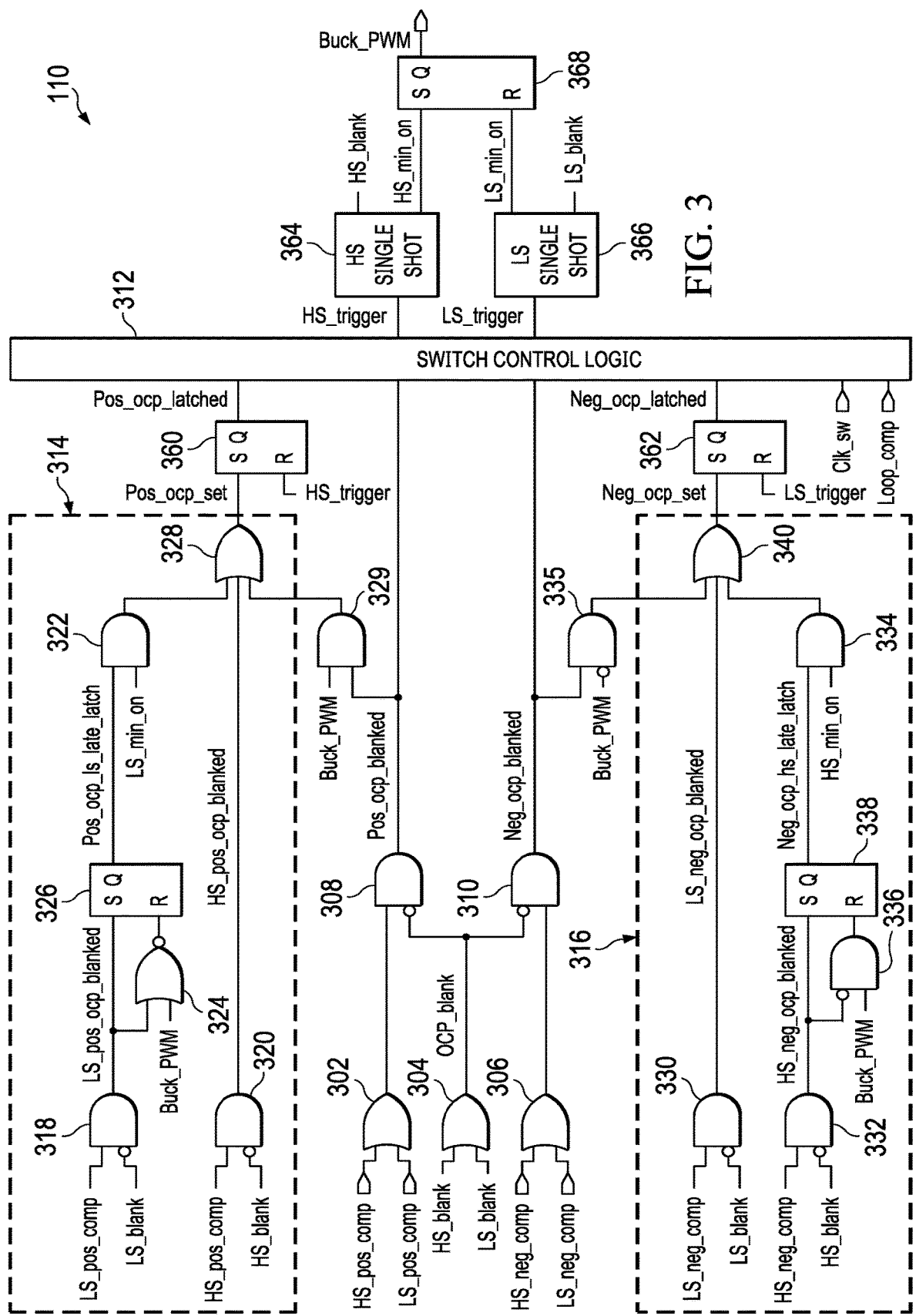
FIG. 3 is a circuit diagram of a control circuit for the voltage converter of FIG. 1.

Referring now to FIG. 3, the switching regulator control circuit 110 may have first, second, and third OR gates 302, 304, 306, and first and second AND gates 308, 310 (examples of suitable logic gates). The first and second inputs HS_pos_comp and LS_pos_comp (from the current comparison circuit 108) are applied to inputs of the first OR gate 302. Blanking signals HS_blank and LS_blank are applied to inputs of the second OR gate 304. The third and fourth inputs HS_neg_comp and LS_neg_comp (from the current comparison circuit 108) are applied to inputs of the third OR gate 306.

Thus, when the current sensed at the switching node 220 (FIG. 2) is greater than either of the currents associated with the first and second reference voltages 5A_ref_voltage, 4A_ref_voltage, during the corresponding high-side or low-side operation, the output of the first OR gate 302 (FIG. 3) is high. Otherwise, the output of the first OR gate 302 is low. When either or both of the blanking signals HS_blank, LS_blank is high, the output OCP_blank of the second OR gate 304 is high. Otherwise, the output OCP_blank of the second OR gate 304 is low. When the current sensed at the switching node 220 (FIG. 2) is less than either of the currents associated with the third and fourth reference voltages −1A_ref_voltage, −2A_ref_voltage, during the corresponding high-side or low-side operation, the output of the third OR gate 306 is high. Otherwise, the output of the third OR gate 306 is low.

The output of the first OR gate 302 is applied to a first input of the first AND gate 308, and the output OCP_blank of the second OR gate 304 is applied to an inverting input of the first AND gate 308. The output of the third OR gate 306 is applied to a first input of the second AND gate 310, and the output OCP_blank of the second OR gate 304 is applied to an inverting input of the second AND gate 310. As a result, when the output OCP_blank of the second OR gate 304 is high (because at least one of the blanking signals HS_blank, LS_blank is high), the outputs Pos_ocp_blanked, Neg_ocp_blanked of the first and second AND gates 308, 310 are both low.

The output Pos_ocp_blanked of the first AND gate 308 is high when the output of the first OR gate 302 is high and the output OCP_blank of the second OR gate 304 is low, that is, when (1) the current sensed at the switching node 220 (FIG. 2) is greater than at least one of the currents associated with the first and second reference voltages 5A_ref_voltage, 4A_ref_voltage, during the corresponding high-side or low-side operation and (2) neither of the blanking signals HS_blank, LS_blank is high. Likewise, the output Neg_ocp_blanked of the second AND gate 310 is high when the output of the third OR gate 306 is high and the output OCP_blank of the second OR gate 304 is low, that is, when (1) the current sensed at the switching node 220 (FIG. 2) is less than at least one of the currents associated with the third and fourth reference voltages −1A_ref_voltage, −2A_ref_voltage, during the corresponding high-side or low-side operation and (2) neither of the blanking signals HS_blank and LS_blank is high. The outputs Pos_ocp_blanked, Neg_ocp_blanked of the AND gates 308, 310 are applied to a switch control logic circuit 312 (described in more detail below).

Further, the switching regulator control circuit 110 has first and second circuits 314, 316 for enabling monitoring of comparators after the control logic has changed the PWM signal Buck_PWM, as long as the corresponding transistor 210, 222 is conducting, to provide sufficiently long HS and LS periods to sense inductor current reliably. The first such circuit 314 (an example of a latching circuit) has first, second, and third AND gates 318, 320, 322, a NOR gate 324, a set-reset latch 326, and an OR gate 328 (examples of digital logic elements). The second input LS_pos_comp is applied to a first input of the first AND gate 318, and the second blanking signal LS_blank is applied to an inverting input of the first AND gate 318. The output LS_pos_ocp_blanked of the first AND gate 318 is high when (1) the current sensed at the switching node 220 is greater than the current associated with the second reference voltage 4A_ref_voltage, (2) the low-side gate signal LS_gate (applied to the second comparator-related AND gate 215) is high, and (3) the second blanking signal LS_blank is low. Otherwise, the output LS_pos_ocp_blanked of the first AND gate 318 is low.

The output LS_pos_ocp_blanked of the first AND gate 318 is applied to a first input of the NOR gate 324, and the PWM signal Buck_PWM is applied to another input of the NOR gate 324. In operation, the output of the NOR gate 324 is high when the output LS_pos_ocp_blanked of the first AND gate 318 is low and the PWM signal Buck_PWM is also low. Otherwise, the output of the NOR gate 324 is low.

The output LS_pos_ocp_blanked of the first AND gate 318 is also applied to the set terminal S of the latch 326. The output of the NOR gate 324 is applied to the reset terminal R of the latch 326. The latch 326 generates an output Pos_ocp_ls_late_latch which is applied to a first input of the third AND gate 322. A low-side minimum time signal LS_min_on (described further below) is applied to a second input of the third AND gate 322.

The first input HS_pos_comp is applied to a first input of the second AND gate 320, and the first blanking signal HS_blank is applied to an inverting input of the second AND gate 320. The output HS_pos_ocp_blanked of the second AND gate 320 is high when the first input HS_pos_comp is high and the first blanking signal HS_blank is low. Otherwise, the output HS_pos_ocp_blanked of the second AND gate 320 is low. The outputs of the third and second AND gates 322, 320, and a signal from an additional AND gate 329, are applied to inputs of the OR gate 328. The output of the additional AND gate 329 is high when the output Pos_ocp_blanked from the first AND gate 308 is high and the PWM signal Buck_PWM is high. The output POS_ocp_set of the OR gate 328 is high when the output of the third AND gate 322 is high, the output HS_pos_ocp_blanked of the second AND gate 320 is high, and/or the output of the additional AND gate 329 is high.

The second enabling circuit 316 (another example of a latching circuit) has first, second, and third AND gates 330, 332, 334, a fourth AND gate 336, a latch 338, and an OR gate 340 (examples of digital logic circuits). The third input HS_neg_comp is applied to a first input of the second AND gate 332, and the first blanking signal HS_blank is applied to an inverting input of the second AND gate 332. The output HS_neg_ocp_blanked of the second AND gate 332 is high when (1) the current sensed at the switching node 220 is less than the current associated with the third reference voltage −1A_ref_voltage, (2) the HS_gate signal HS_gate (applied to the third comparator-related AND gate 217) is high, and (3) the first blanking signal HS_blank is low. Otherwise, the output HS_neg_ocp_blanked of the second AND gate 332 is low.

The output HS_neg_ocp_blanked of the second AND gate 332 is applied to an inverting input of the fourth AND gate 336, and the PWM signal Buck_PWM is applied to a non-inverting input of the fourth AND gate 336. The output of the fourth AND gate 336 is high when the output HS_neg_ocp_blanked of the second AND gate 332 is low and the PWM signal Buck_PWM is high. Otherwise, the output of the fourth AND gate 336 is low.

The output HS_neg_ocp_blanked of the second AND gate 332 is applied to the set terminal S of the latch 338. The output of the fourth AND gate 336 is applied to the reset terminal R of the latch 338. The latch 338 generates an output Neg_ocp_hs_late_latch which is applied to a first input of the third AND gate 334. A high-side minimum time signal HS_min_on (described in more detail below) is applied to a second input of the third AND gate 334.

Meanwhile, the fourth input LS_neg_comp is applied to a first input of the first AND gate 330, and the second blanking signal LS_blank is applied to an inverting input of the first AND gate 330. The output LS_neg_ocp_blanked of the first AND gate 330 is high when the fourth input LS_neg_comp is high and the second blanking signal LS_blank is low. Otherwise, the output LS_neg_ocp_blanked of the first AND gate 330 is low. The output of the third AND gate 334, the output LS_neg_ocp_blanked of the first AND gate 330, and a signal from an additional AND gate 335, are applied to inputs of the OR gate 340. The output of the additional AND gate 335 is high when the output Neg_ocp_blanked from the second AND gate 310 is high and the PWM signal Buck_PWM is low. The output Neg_ocp_set of the OR gate 340 is high when the output of the third AND gate 334 is high, the output LS_neg_ocp_blanked of the first AND gate 330 is high, and/or the output of the additional AND gate 335 is high. Otherwise, the output Neg_ocp_set of the OR gate 340 is low.

It should be noted that late latching (326) is applied in the first enabling circuit 314 to a signal associated with the second input LS_pos_comp, but not to a signal associated with the first input HS_pos_comp. The current level limit associated with the first input HS_pos_comp is greater than the current level limit associated with the second input LS_pos_comp. Likewise, late latching (338) is applied in the second enabling circuit 316 to a signal associated with the third input HS_neg_comp, but not to a signal associated with the fourth input LS_pos_comp. The current level limit associated with the fourth input LS_neg_comp is less than the current level limit associated with the third input HS_neg_comp.

The outputs Pos_ocp_set, Neg_ocp_set of the OR gates 328, 340 of the first and second enabling circuits 314, 316 are applied to set terminals S of respective additional latches 360, 362. HS and LS trigger signals HS_trigger, LS_trigger (described in more detail below) are applied to the respective reset terminals R of the additional latches 360, 362. Latched outputs Pos_ocp_latched, Neg_ocp_latched of the additional latches 360, 362 are applied to the switch control logic circuit 312, as are a clock timing signal Clk_sw and the input Loop_comp from the loop comparator 200 (FIG. 2).

The latched outputs Pos_ocp_latched, Neg_ocp_latched of the first and second additional latches 360, 362 are reset by the HS and LS trigger signals HS_trigger, LS_trigger, respectively. When the HS trigger signal HS_trigger is high (that is, when the buck converter 104 is switching to an on condition of the high side switch 210), the latched output Pos_ocp_latched of the first additional latch 360 is low. When the LS trigger signal LS_trigger is high (that is, when the buck converter 104 is switching to an on condition of the low side switch 222), the latched output Neg_ocp_latched of the second additional latch 362 is low.

As further explained below in connection with FIG. 4, the switch control logic circuit 312 (FIG. 3) drives the inductor current (at the switching node 220) to a safe level based on at least four inputs Pos_ocp_latched, Pos_ocp_blanked, Neg_ocp_blanked, Neg_ocp_latched. The HS and LS trigger signals HS_trigger, LS_trigger, which are applied to the reset terminals R of the additional latches 360, 362, are generated as outputs of the switch control logic circuit 312. The trigger signals HS_trigger, LS_trigger are also applied to respective HS and LS single shot blocks 364, 366.

In operation, the rising edge of the HS trigger signal HS_trigger causes the HS single shot block 364 to generate the first blanking signal HS_blank and the high-side minimum time signal HS_min_on, each of which are high for a predetermined period of time. In each case, the time period from the rising edge to the falling edge of the first blanking signal HS_blank and the high-side minimum time signal HS_min_on is the predetermined period of time. The rising edge of the LS trigger signal LS_trigger causes the LS single shot block 366 to generate the second blanking signal LS_blank and the low-side minimum time signal LS_min_on, each of which are high for a predetermined period of time. In each case, the time period from the rising edge to the falling edge of the second blanking signal LS_blank and the low-side minimum time signal LS_min_on is the predetermined period of time.

As mentioned above, the first blanking signal HS_blank is applied to the inverting inputs of the HS-associated AND gates 320, 332 of the first and second enabling circuits 314, 316, and to an input of the second OR gate 304. The second blanking signal LS_blank is applied to the inverting inputs of the LS-associated AND gates 318, 330 of the enabling circuits 314, 316, and to another input of the second OR gate

304. The high-side and low-side minimum time signals HS_min_on, LS_min_on enable recognition of late latching signals Neg_ocp_hs_late_latch, Pos_ocp_Is_late_latch in the second and first enabling circuits 316, 314, through the respective AND gates 334, 322.

The high-side and low-side minimum time signals HS_min_on, LS_min_on are also applied to the set and reset terminals S, R, respectively, of a fifth latch 368 to generate the PWM signal Buck_PWM. Whenever the high-side minimum time signal HS_min_on is high (that is, from the rising edge of the HS trigger signal HS_trigger until the end of the predetermined time period thereafter), the PWM signal Buck_PWM is set (latched) high. The PWM signal Buck_PWM is low whenever the high-side minimum time signal HS_min_on is low and the fifth latch 368 has been reset by the low-side minimum time signal LS_min_on. The low-side minimum time signal LS_min_on is high from the rising edge of the LS trigger signal LS_trigger until the end of the predetermined time period thereafter.

According to one aspect of the present description, control logic operation for a positive current limit late detection may be as follows: The first input HS_pos_comp is detected when the buck converter 104 is in a high-side operation condition, the inductor current (at the switching node 220) is greater than the HS positive current limit level (5 A in this example), and the first blanking signal HS_blank is low. If the first input HS_pos_comp is detected after the control logic has already decided to switch to a low-side operation condition, then the output of the first additional latch 360 Pos_ocp_latched is set high, and the switch control logic keeps the buck converter 104 in the low-side operation condition (with the LS switch 222 in an on condition) until the inductor current has decreased below the LS positive current limit level (4 A in this example).

The second input LS_pos_comp is detected when the converter 104 is in a low-side operation condition, the current at the switching node 220 is greater than the LS positive current limit level (4 A in this example), and the second blanking signal LS_blank is low. If the second input LS_pos_comp is detected after the control logic has decided to switch to a high-side operation condition, then the late latch signal Pos_ocp_Is_late_latch is set, and when the buck converter 104 next time goes to a low-side operation condition, the output from the first additional latch 360 Pos_ocp_latched is set, and switch control logic keeps the buck converter 104 in the low-side operation condition until the inductor current has decreased below the LS positive current limit level (4 A in this example).

Further, control logic operation for a negative current limit late detection may be as follows: The fourth input LS_neg_comp is detected when the buck converter 104 is in a low-side operation condition, the current at the switching node 220 is less than the LS negative current limit level (-2 A in this example), and the second blanking signal LS_blank is low. If the fourth input LS_neg_comp is detected after the control logic has decided to switch to a high-side operation condition, then the output Neg_ocp_latched of the second additional latch 362 is set high and the switch control logic keeps the buck converter 104 in the high-side operation condition until the inductor current has increased above the HS negative current limit level (-1 A in this example).

The third input HS_neg_comp is detected when the converter 104 is in a high-side operation condition, the current at the switching node 220 is less than the HS negative current limit (-1 A in this example), and the first blanking signal HS_blank is low. If the third input HS_neg__comp is detected after the control logic has decided to switch to a low-side operation condition, then the corresponding late latch signal Neg_ocp_hs_late_latch is set, and when the buck converter 104 next time goes to a high side operation condition, the output signal Neg_ocp_latched of the second additional latch 362 is set high and switch control logic keeps the buck converter 104 in the high-side operation condition until the inductor current (at the switching node 220) has increased above the HS negative current limit (-1 A in this example).

Thus, according to one aspect of the present description, the over-current protection comparators 212, 214, 216, 218 may be monitored even after the control logic has decided to change the states of the power FETs 210, 222, until the gate voltage of the FETs 210, 222 starts changing. HS comparators 212, 216 for late detection are blanked only with the first blanking signal HS_blank and LS comparators 214, 218 for late detection are blanked only with the second blanking signal LS_blank. The late over-current detection logic may be used to capture if the inductor current was too high (or low) during the previous switching cycle. If a late over current is detected, the switch control logic is used to drive the inductor current to within desired levels.

Figure 4:
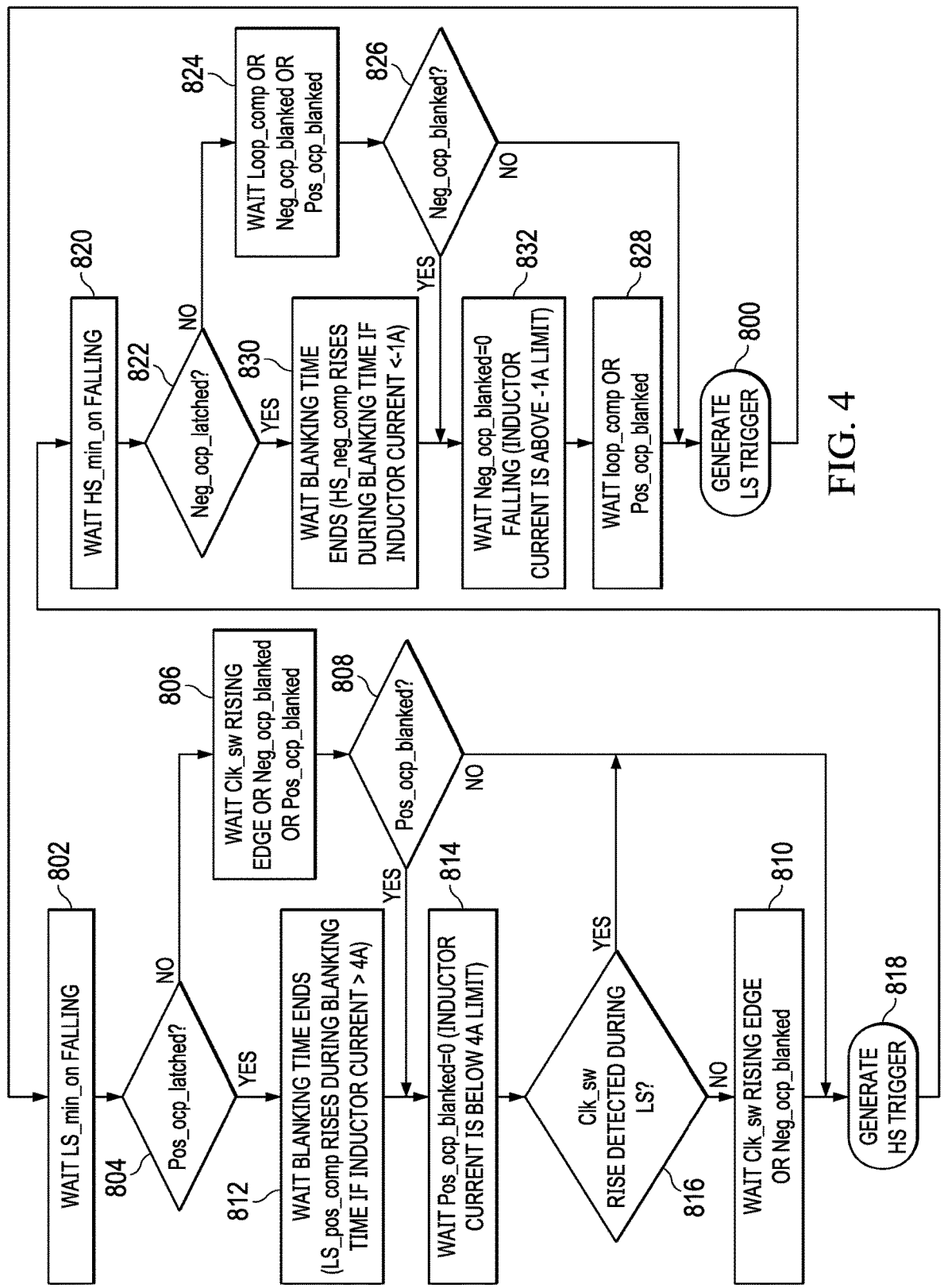
FIG. 4 is a flow chart for a method of operating the control circuit of FIG. 3.

The switch control logic 312 (FIG. 3) may be configured such that the switching regulator control circuit 110 operates as illustrated in FIG. 4. After the LS trigger signal LS_trigger is generated (after step 800), the switch control logic waits until the low-side minimum time signal LS_min_on goes low (step 802). (The low-side minimum time signal LS_min_on enables detection of the late-latch signal Pos_ocp_Is_late_latch in the first enabling circuit 314.) The switch control logic then determines whether the output Pos_ocp_latched of the first additional latch 360 is set (step 804). If the output Pos_ocp_latched of the first additional latch 360 is not set (No from step 804), then the switch control logic waits to receive the clock switching signal Clk_sw or one of the outputs Neg_ocp_blanked, Pos_ocp_blanked generated outside of the enabling circuits 314, 316 (step 806). When one of those three signals Clk_sw, Neg_ocp_blanked, Pos_ocp_blanked is high, then the switch control logic determines whether the output Pos_ocp_blanked of the first AND gate 308 is high (step 808). If the output Pos_ocp_blanked of the first AND gate 308 is low (No from step 808), then the HS trigger signal HS_trigger is generated to switch the buck converter 104 to a high-side operation condition (step 818).

If the output Pos_ocp_latched of the first additional latch 360 is set when the low-side minimum time signal goes low (Yes from step 804), then the switch control logic waits for the LS blanking signal to go low (at the end of the LS blanking time) (step 812). The second input LS_pos_comp (that is, the gated output (215) of the second comparator 214 during low-side operation) rises during that blanking time when the inductor current at the switching node 220 is greater than the lower current limit level of the upper current limit range (4 A in the illustrated example). Then, low side operation is continued until the inductor current falls below the lower current limit level of the upper current limit range, such that the output Pos_ocp_blanked of the first AND gate 308 goes low (step 814). The low side operation is also continued, until the inductor current falls below the lower current limit level of the upper current limit range (step 814), in response to a determination in step 808 that the output Pos_ocp_blanked of the first AND gate 308 is high (step 814 follows Yes from step 808).

In either event, once the inductor current falls below the lower current level of the upper current limit range (at the conclusion of step 814), a determination is made as to whether the clock switching signal Clk_sw has risen during the low side operation (step 816). If the low side operation has been performed long enough for the clock switching signal Clk_sw to have risen (Yes from step 816), then the switch control logic generates the HS trigger signal HS_trigger to switch the converter 104 a high-side operation condition (step 818). If the low-side operation has not been performed long enough for the clock switching signal Clk_sw to have risen (No from step 816), then the switch control logic waits for one of the clock switching signal Clk_sw or the output Neg_ocp_blank of the second AND gate 310 to rise (step 810), and then the switch control logic generates the HS trigger signal HS_trigger.

After the HS trigger signal HS_trigger is generated (after step 818), the switch control logic waits until the high-side minimum time signal HS_min_on goes low (step 820). (The high-side minimum time signal HS_min_on enables detection of the late-latch signal Neg_ocp_hs_late_latch in the second enabling circuit 316.) The switch control logic then determines whether the output Neg_ocp_latched of the second additional latch 362 is set (step 822). If the output Neg_ocp_latched of the second additional latch 362 is not set (No from step 822), then the switch control logic waits to receive the loop signal Loop_comp signal (that is, the output of the loop comparator 200) or one of the outputs Neg_ocp_blanked, Pos_ocp_blanked generated outside of the enabling circuits 314, 316 (step 824). When one of those three signals Loop_comp, Neg_ocp_blanked, Pos_ocp_blanked is high, then the switch control logic determines whether the output Neg_ocp_blanked of the second AND gate 310 is high (step 826). If the output Neg_ocp_blanked is low (No from step 826), then the LS trigger signal LS_trigger is again generated (step 800).

If the output Neg_ocp_latched of the second additional latch 362 is set when the high-side minimum time signal HS_min_on goes low (Yes from step 822), then the switch control logic waits for the HS blanking signal HS_blank to go low (at the end of the HS blanking time) (step 830). The third input HS_neg_comp (that is, the gated output (217) of the third comparator 216 during high-side operation) rises during that blanking time when the inductor current at the switching node 220 is less than the upper current limit level of the lower current limit range (−1 A in the illustrated example). Then, high side operation is continued until the inductor current exceeds the upper current limit level of the lower current limit range, such that the output Neg_ocp_blanked of the second AND gate 310 goes low (indicating that the inductor current is greater than the upper current limit level of the lower current limit range (−1 A in the illustrated example)) (step 832). Then, after the loop signal Loop_comp or the output Pos_ocp_blanked of the first AND gate 308 is high (that is, at the conclusion of step 828), the switch control logic generates the LS trigger signal LS_trigger to switch the converter 104 back to a low-side operation condition (step 800). The high side operation is also continued, until the inductor current rises above the upper current limit level of the lower current limit range (step 832), in response to a determination in step 826 that the output Neg_ocp_blanked of the second AND gate 310 is high (step 832 follows Yes from step 826).

In connection with the foregoing, the voltage at the switch node 220 is a function of the current through the inductor 224 and the resistance of the transistor 210, 222 through which the same current is conducted. During high-side operation, V_sw=VIN−I*R_HS_on, where V_sw is the sensed voltage applied to the comparators 212, 214, 216, 218, VIN is the input voltage from the power source 102, I is the current through the high-side switch 210, R_HS_on is the resistance of the high-side switch 210, and I*R_HS_on is the voltage drop across the high-side switch 210. During low-side operation, V_sw=GND−I*R_LS_on, where V_sw is the sensed voltage applied to the comparators 212, 214, 216, 218, GND is the voltage of the ground terminal, I is the current through the low-side switch 222, R_LS_on is the resistance of the low-side switch 222, and I*R_LS_on is the voltage drop across the low-side switch 222. In each case, when the current I increases, the sensed voltage V_sw decreases, and vice versa.

In operation, however, the switch resistances R_HS_on, R_LS_on may depend on various factors, including a manufacturing process, temperature, and the respective gate-source voltages vgs. Therefore, desired voltage sensing or reference voltage generation may be done using replica switches (not illustrated in the drawings) with resistances that match the actual resistances of the power FETs 210, 222. In addition, the current-sensing circuit 220, 108 may be configured, with a suitable level-shifting circuit (not illustrated in the drawings), to level-shift the sensed and reference voltages applied to the comparators 212, 214, 216, 218 so that the applied voltages are not above VIN (HS_neg_ocp) or below GND (LS_pos_ocp).

Figure 5:
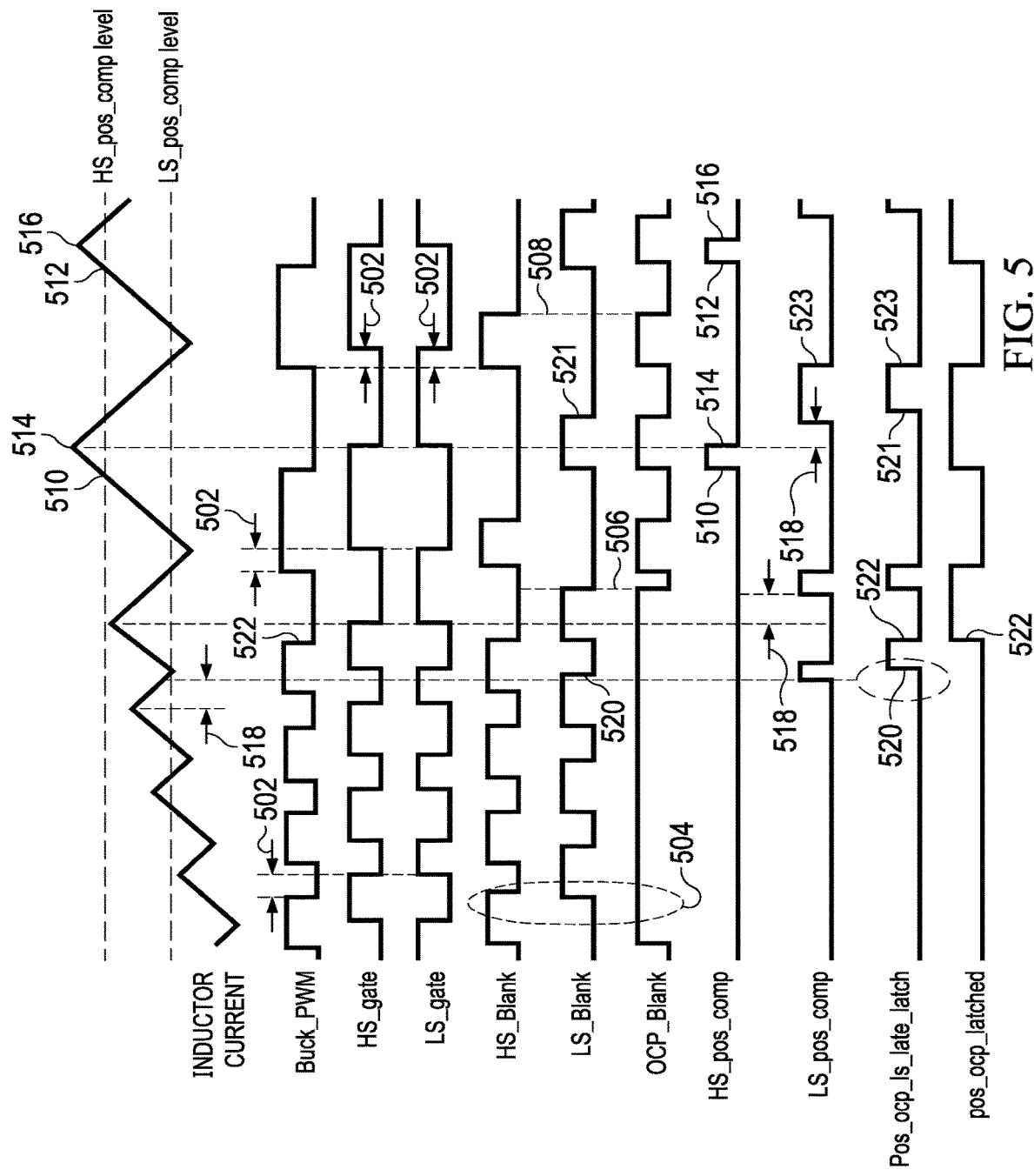
FIG. 5 is a timing diagram for a method of operating the voltage converter of FIG. 1.

FIG. 5 is a timing diagram for a method of operating the voltage converter 104 illustrated in FIGS. 1 and 2 (with the switching regulator control circuit 110 illustrated in FIGS. 2-4). In operation, the HS gate signal HS_gate is applied to the gate terminal of the HS transistor 210, and goes high and low in response to the PWM signal Buck_PWM going high and low, respectively, but there is a time delay 502 between the rising and falling of the PWM signal Buck_PWM and the rising and falling, respectively, of the HS gate signal HS_gate. Likewise, the LS gate signal LS_gate applied to the gate terminal of the LS transistor 222 goes low and high in response to the PWM signal Buck_PWM going high and low, respectively, but, again, there is the same time delay 502 between the falling and rising of the PWM signal Buck_PWM and the rising and falling, respectively, of the LS gate signal LS_gate. In each case, the delay 502 may be caused by propagation delays of the switch control logic and the FET drivers.

The HS blank signal HS_blank and the PWM signal Buck_PWM are established by the HS single shot block 364, operating through the set terminal S of the third latch 368. Therefore, the HS blanking signal HS_blank and the PWM signal Buck_PWM go high together, and each time the HS blanking signal HS_blank goes high it remains high for a fixed period of time, but the HS blanking signal HS_blank and the PWM signal Buck_PWM do not necessarily go low together.

The LS blanking signal LS_blank and the PWM signal Buck_PWM, operating through the reset terminal R of the third latch 368, go high and low, respectively, together, and each time the LS blanking signal LS_blank goes high it remains high for the fixed period of time. The LS blanking signal LS_blank and the PWM signal Buck_PWM do not necessarily go low and high, respectively, together. Importantly, when the frequency of the PWM signal Buck_PWM is high, the HS and LS blanking signals HS_blank, LS_blank may overlap each other in time, as illustrated, for example, within dotted oval 504.

The combined blanking signal OCP_blank, generated by the second OR gate 304, is high whenever at least one of the HS and LS blanking signals HS_blank, LS_blank is high. The combined blanking signal OCP_blank is low only when both of the HS and LS blanking signals HS_blank, LS_blank are low, for example, at times 506, 508.

The first input HS_pos_comp (associated with the highest current limit) goes high when (1) the inductor current is greater than the HS_pos_comp level (5 A in the illustrated example) and (2) the inductor current is increasing (that is, during high side operation, when the HS transistor 210 is on), for example, at times 510, 512. The first input HS_pos_comp goes low when the PWM signal Buck_PWM causes the transistors 210, 222 to switch states, such that the inductor current starts to decrease, as at, for example, times 514, 516.

The second input LS_pos_comp goes high when (1) the inductor current is greater than the LS_pos_comp level (4 A in the illustrated example) and (2) the inductor current is decreasing (that is, during low side operation, when the LS transistor 222 is on), but only after a delay 518. In the situation illustrated in FIG. 5, the delay 518 for the second input LS_pos_comp is apparent but there is no such delay for the first input HS_pos_comp. This is because the inductor current during a low side operation starts at an already high current level, whereas the inductor current during a high side operation starts at a lower level and increases, giving the first comparator 212 time to provide a reliable comparison before the inductor current exceeds the HS_pos_comp level.

Late latching of the second input LS_pos_comp is implemented by latches 326, 360. The output Pos_ocp_ls_late_latch is set high when the second input LS_pos_comp is high and the second blanking signal LS_blank is low, for example, at times 520, 521. At time 520, low side positive over current protection (LS OCP) is latched after the LS blanking signal LS_blank falls, even though the PWM signal Buck_PWM has switched to high side operation already. This latching enables current limit operation with high switching frequency. The output Pos_ocp_ls_late_latch of latch 326 is reset low when the PWM signal Buck_PWM goes low, for example, at time 522, or when the second input LS_pos_comp goes low, for example, at time 523.

The output Pos_ocp_latched of latch 360 is set in the beginning of the next LS period of the PWM Buck_PWM signal (for example, at time 522). The output Pos_ocp_latched may be used to bring the inductor current below the LS_pos_comp level. The inductor current continues to fall even after it has reached the LS_pos_comp level, and after the PWM signal Buck_PWM switches, because of the delay 502 between the Buck_PWM signal and the HS and LS gate signals HS_gate, LS_gate. As a result, there is enough time in the following HS period to reliably detect the inductor current exceeding the higher HS_pos_comp level.

FIG. 5 illustrates what may happen when switching of the PWM signal Buck_PWM is performed at high frequency. Late LS overcurrent detection is latched after the PWM signal Buck_PWM signal has already switched to HS, but the LS gate 222 is still high due to propagation delays of the control logic and the FET drivers.

Figure 6:
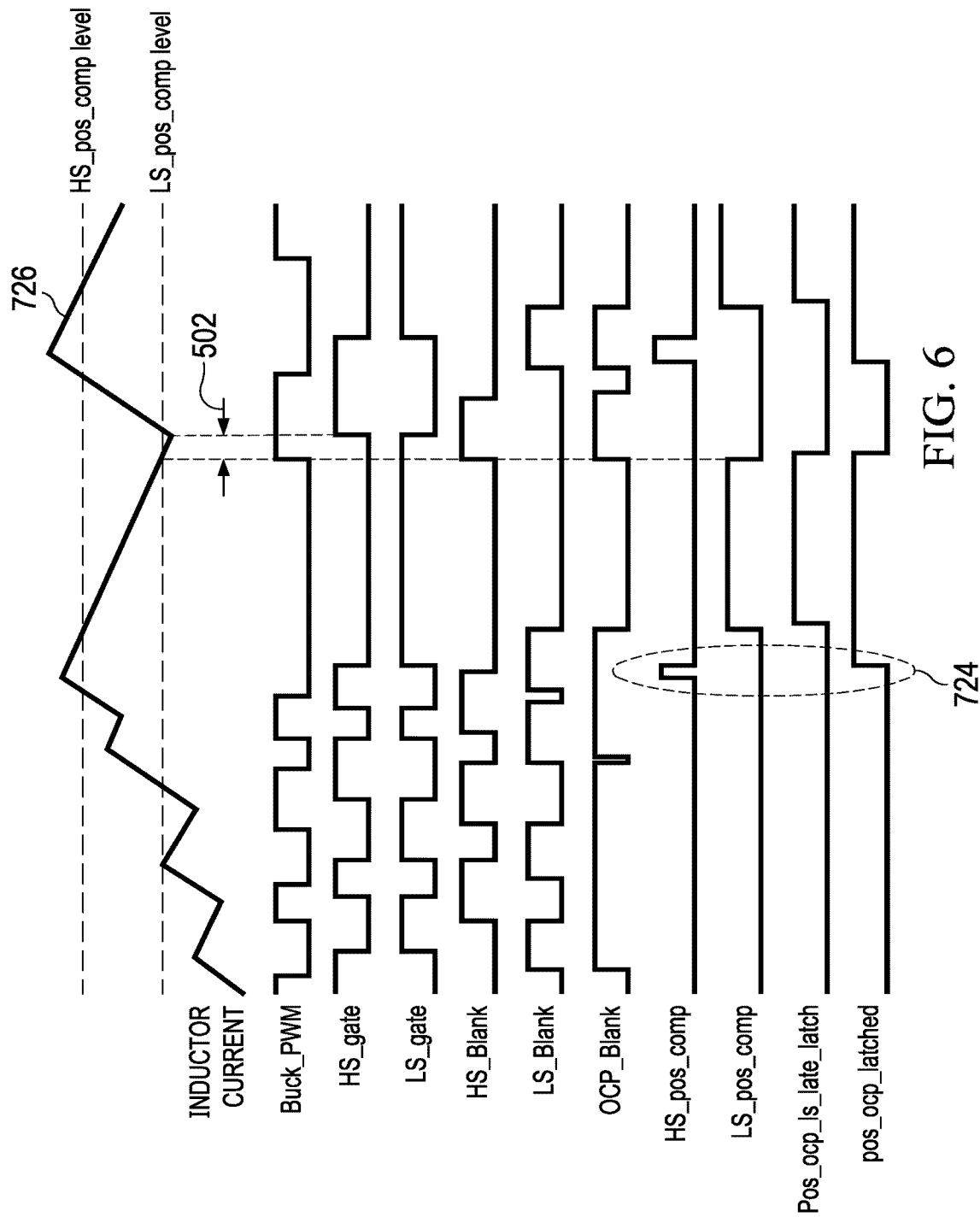
FIG. 6 is another timing diagram for a method of operating the voltage converter of FIG. 1.

FIG. 6 illustrates what may happen when late high-side over current detection is latched after the PWM signal Buck_PWM has already gone to low side operation, but the HS gate 210 is still on due to propagation delays of the control logic and the FET drivers. As illustrated in connection with oval 724, HS positive over-current protection is latched after the first blanking signal HS_blank falls even though the PWM signal Buck_PWM has switched to high side operation already. The HS OCP comparator data is available until the HS gate signal HS_gate falls. This is important because it enables current limiting operation with high switching frequency. Also, as was the case in FIG. 5, Pos_ocp_latched may be used to bring the inductor current below the LS_pos_comp level, for example, at time 726, where the delay 502 occurs between the time when the second input LS_pos_comp falls (and the PWM signal Buck_PWM switches to HS) and the time when the HS transistor 210 actually goes on.

The load 116 may be, if desired, a component of an automotive radar application which requires high switching frequency and accurate peak current limit operation. When switching with high frequency, one or more of the HS and LS periods may be shorter than the current limit detection time depending on the duty ratio. The system described in U.S. patent application Ser. No. 16/945,666 uses two comparators for the HS and LS periods with different reference levels to limit accurately the positive peak inductor current of the buck converter. Similarly, the negative peak inductor current is limited with two comparators. The system described in the present application has advantages compared to the system described in U.S. patent application Ser. No. 16/945,666, especially in connection with high frequency operation.

Advantages may be achieved by continuing to monitor HS OCP comparators 212, 216 after the switch control logic has made the decision to go LS, as long as the HS FET 210 is conducting. This can be done because after the HS_blank signal has gone low, the current sense information is reliable right until the point where the HS FET gate voltage starts changing again. Similarly, LS OCP comparators 214, 218 may be monitored after the switch control logic has made the decision to go HS, as long as the LS FET 222 is conducting. If an over current is detected after the switch control logic has switched, the late detection is latched and the inductor current is brought below the LS positive current limit level (4 A in the illustrated example) or above the HS negative current limit level (−1 A in the illustrated example). As a result, a sufficient current sensing time for reliably detecting an over current condition may be achieved.

Implementing converter circuits as described above eliminates the number of occurrences of voltage spikes in instances where the converter circuits operate at high frequencies. Because of the ability to limit a current of an output circuit for applications operating at high frequencies, the voltage converter described above may be utilized in a fixed high-frequency automotive radar system.

If desired, parts of the voltage converter 104, such as the current comparison circuit 108, the switching regulator control circuit 110, the switching regulator circuit 112, and the compensator 201 (together, the controller 108, 110, 112, 201 for the voltage converter 104) may be integrated into an integrated circuit (IC) and/or formed on or over a single semiconductor die 113 (FIGS. 1 and 2) according to various semiconductor and/or other processes. The conductive lines of the IC may be metal structures formed in or between insulating layers over the semiconductor die 113, doped regions (that may be silicided) formed in the semiconductor die 113, or doped semiconductor structures (that may be silicided) formed over the semiconductor die 113. Transistors used to implement the circuit structures of the example embodiments may be bipolar junction transistors (BJT) or metal-oxide-semiconductor field-effect transistors (MOSFET) and can be n-type or p-type. The integrated devices and elements may also include resistors, capacitors, logic gates and other suitable electronic devices that are not shown in the drawings for the sake of clarity. The present description is not limited to the details and specific features of the examples shown in the drawings and otherwise described herein.

Further, please note that, in this description, the term "couple" may cover connections, communications, or signal paths that enable a functional relationship consistent with this description. For example, if device A generates a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal generated by device A. Also, in this description, a value that is "associated with" or that "corresponds to" another value may describe a relationship between the value and the another value. The relationship may be determined using calculations, tables, or any other suitable method, for example. For example, a voltage that is associated with a current may describe a relationship between the voltage and the current such that when the voltage is known, the current may be assumed or vice versa. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While certain components may be described herein as being of a particular process technology, these components may be exchanged for components of other process technologies. Circuits described herein are reconfigurable to include the replaced components to provide functionality at least partially similar to functionality available before the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor. Also, uses of the phrase "ground voltage potential" in this description include a chassis ground, an Earth ground, a floating ground, a virtual ground, a digital ground, a common ground, and/or any other form of ground connection applicable to, or suitable for, the teachings of this description. Unless otherwise stated, "about," "approximately, or "substantially" preceding a value means +/−10 percent of the stated value.

Modifications are possible in the described examples, and other examples are possible, within the scope of the claims.

The invention claimed is:

1. A controller circuit, comprising:
a current comparison circuit having at least four comparators configured to:
compare a voltage of an output circuit to respective reference voltages; and
compare a sensed current from the output circuit to a first set of current limits defining an upper current limit range, and to a second set of current limits defining a lower current limit range; and
a switching regulator control circuit configured to receive outputs from the comparators, and generate a control signal for alternatingly switching first and second transistors off and on, such that the first transistor is off when the second transistor is on, and the second transistor is off when the first transistor is on.

2. The controller circuit of claim 1, wherein the first transistor and the second transistor are field effect transistors.

3. The controller circuit of claim 2, wherein the first transistor and the second transistor are coupled to each other in series, such that an input is applied to a first end of an inductor when the first transistor is on, and the first end of the inductor is connected to ground when the second transistor is on.

4. The controller circuit of claim 1, wherein the output circuit has an input coupled to the current comparison circuit and includes an output adaptable to be coupled to a load, an inductor, and a capacitor coupled to the inductor.

5. The controller circuit of claim 1, further including a latching circuit configured to latch a signal associated with a lower current limit level of the first set of current limits.

6. The controller circuit of claim 5, further including a second latching circuit configured to latch a signal corresponding to an output from one of the comparators.

7. The controller circuit of claim 6, wherein the second latching circuit includes a latch configured to latch a signal associated with an upper current limit of the second set of current limits.

8. The controller circuit of claim 5, wherein the latching circuit includes a latch configured to latch a signal associated with an upper current limit of the second set of current limits.

9. The controller circuit of claim 8, wherein the switching regulator control circuit includes a second latching circuit configured to latch a signal corresponding to an output from one of the comparators.

10. The controller circuit of claim 9, wherein the second latching circuit includes a latch configured to latch a signal associated with a lower current limit of the first set of current limits.

* * * * *